April 10, 1945.    O. W. LIVINGSTON    2,373,544
ELECTRIC CONTROL CIRCUIT
Filed Feb. 15, 1943
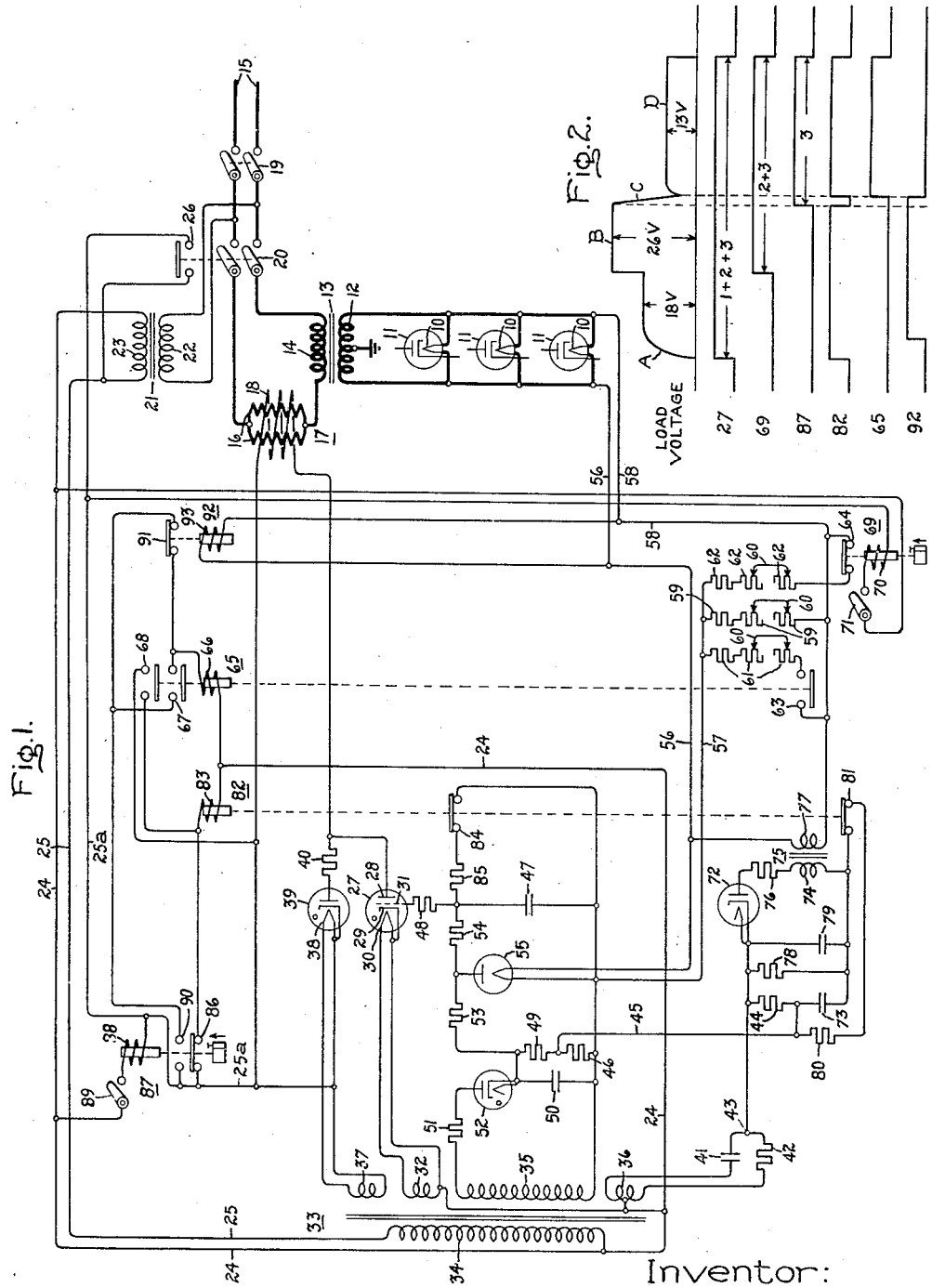
Inventor:
Orrin W. Livingston,
by Harry E. Dunham
His Attorney.

Patented Apr. 10, 1945

2,373,544

UNITED STATES PATENT OFFICE 2,373,544

ELECTRIC CONTROL CIRCUIT

Orrin W. Livingston, Scotia, N. Y., assignor to General Electric Company, a corporation of New York Application February 15, 1943, Serial No. 475,878

10 Claims. (Cl. 250—27)

My invention relates to electric control circuits and more particularly to improved electric valve regulating circuits.

In certain applications, it is desirable to maintain the energization of a load circuit at different levels during successive time intervals. In accordance with the teachings of my invention, I provide an improved circuit of this character in which the energization of the load circuit is closely regulated at the different levels which are pre-established by adjustments which are readily made.

It is an object of my invention to provide a new and improved electric control circuit.

It is another object of my invention to provide a new and improved electric regulating system.

It is still another object of my invention to provide a new and improved circuit for maintaining an electrical condition of a load circuit at different levels during successive time intervals and for regulating the electrical condition during each of the intervals to maintain the condition at the desired value independently of variations in supply circuit voltage or in the magnitude of the load impedance.

In the illustrated embodiment of my invention, a load circuit such as the filaments of a plurality of electric valves is energized by a preestablished pattern of voltage from an alternating-current supply circuit. A control system for effecting the energization of a load circuit in accordance with a predetermined time pattern from an alternating current circuit is described and claimed in copending Bivens application Serial No. 460,240, filed September 30, 1942, and assigned to the assignee of the present invention. The disclosure of the Bivens application is prior art with respect to my invention. The voltage impressed on the load is controlled by a saturable inductive device connected between the supply and load circuits and having a unidirectional magnetizing winding energized from the alternating-current supply circuit through a controlled electric valve. The control voltage for the electric valve is regulated in accordance with the voltage of the load circuit and the settings of a plurality of adjustable resistors which are selectively connected in circuit with a regulating electric valve of the emission-limited type to control the ratio between the voltage of the load circuit and the voltage impressed on the cathode of the regulating valve and thereby to establish the voltage levels impressed on the load circuit during different periods of the load-voltage pattern. Suitable timing devices are employed for effecting the selective connections of the impedance elements with the cathode of the emission-limited regulating electric valve. A control system including an emission-limited electric valve for regulating the current supplied to a load circuit during timed intervals is described and claimed in the copending Cooper application Serial No. 480,150, filed March 23, 1943, and assigned to the assignee of the present invention. This Cooper application is a continuation-in-part of Cooper application Serial No. 423,526, filed December 18, 1941, and assigned to the assignee of this application. The above Cooper applications are prior art with respect to my invention.

My invention will be better understood by reference to the following description taken in connection with the accompanying drawing and its scope will be pointed out in the appended claims. In the drawing, Fig. 1 is a schematic representation of one embodiment of my invention and Fig. 2 diagrammatically illustrates certain operating conditions of the system shown in Fig. 1.

In the drawing, I have shown my invention embodied in a system for maintaining the filaments of electric valves at different voltage levels during successive time intervals during what is called an aging process. As illustrated in the drawing, the filaments 10 of electric valves 11 are connected in parallel across the terminals of a secondary winding 12 of a transformer 13 having the primary winding 14 thereof energized from an alternating current supply circuit 15 through the alternating-current winding 16 of a saturable inductive device 17. The device 17 is provided with a control winding 18 which is variably energized to control the impedance thereof and thereby control the voltage impressed on the transformer 13. Manually operable switches 19 and 20 are connected in series with the supply circuit. A source of alternating-current control voltage is provided by a transformer 21 having the primary winding 22 thereof connected with the conductors of the supply circuit 15 between the switches 19 and 20, so that the transformer 21 is energized as soon as the contacts of switch 19 are closed. The secondary winding 23 of transformer 21 energizes the conductors 24 and 25 which provide a control-voltage bus. A conductor 25a is connected with the same terminal of the winding 23 as conductor 25 through the normally open contact 26 of switch 20.

The control winding 18 of the saturable inductive device 17 is connected in series with an electric valve 27 and across the conductors 24 and 25a. As illustrated in the drawing, the valve 27 is preferably of the type utilizing an ionizable medium, such as a gas or vapor, and comprises an anode 28, a cathode 29, a heater element 30, and a control member or grid 31. The heater element 30 is energized by a transformer secondary winding 32 of a transformer 33 having the primary winding 34 thereof energized from the conductors 24 and 25. Secondary windings 35 and 36 of the transformer 33 provide voltage supplies for energizing the control member 31 of electric valve 27 and the secondary winding 37 provides a voltage for energizing the heater element 38 of an uncontrolled electric discharge valve 39 which is connected in series with a resistor 40 and across the terminals of the control winding 18 of the saturable inductive device 17. The valve 39 is oppositely poled with respect to the valve 27 and winding 18 to conduct current during the half cycles that electric valve 27 is nonconducting and, in this way, to provide for the flow of current through winding 18 resulting from the decay of flux in the associated core.

In order to control the conductivity of electric valve 27 and, in this way, to control the energization of the winding 18, I provide means for impressing on the control member 31 a plurality of voltage components, at least one of which is regulated in accordance with a condition of the load and which is adjusted in steps at predetermined intervals to change the level of the load condition in accordance with a preestablished pattern. Referring now to the drawing, the transformer winding 36 is provided with an intermediate terminal which is connected with the cathode of electric valve 27. A capacitor 41 and resistor 42 are connected in series across the terminals of the transformer winding 36 and provide means for shifting the phase of the voltage between the intermediate terminal of the winding 36 and the common terminal 43 of capacitor 41 and resistor 42 with respect to the voltage of winding 36. The circuit from the terminal 43 to the control member 31 may be traced through a resistor 44, conductor 45, resistor 46, capacitor 47, and current-limiting resistor 48. The voltages appearing across resistors 44, 46, and capacitor 47 cooperate with the alternating-current component of voltage impressed on the control member 31 and provide means for varying the instant of ignition of electric valve 27 as is well understood. The circuits for energizing these elements will now be described. Resistor 46 is connected in series with a resistor 49 and across the terminals of a capacitor 50, which is connected to be charged from the secondary winding 35 of transformer 33 through a resistor 51 and a unilaterally conducting device 52 of any suitable type and which, as illustrated, comprises a two-element electric discharge valve. The voltage across series-connected resistors 46 and 49 is impressed on a circuit including in series resistors 53 and 54 and capacitor 47. In order to control the voltage of capacitor 47 with respect to the voltage across resistors 46 and 49, I provide an electric valve 55 having the anode-cathode circuit connected in parallel with capacitor 47 and resistor 54 in series. The electric valve 55 is of the controlled type and, as illustrated, is of the type employing a filamentary cathode which is variably energized to control the impedance of the valve. The valve 55 may be termed an emission limited regulating valve. One terminal of the filament of the valve 55 is connected directly with one side of the load circuit by a conductor 56. The other terminal of the filament is connected to a conductor 57 which is arranged to be connected to the other side of the load circuit through a conductor 58 and one or more resistance elements which are selectively connected in the circuit at different times to establish the level of voltage to be maintained across the load circuit. As illustrated in the drawing, resistance elements 59 are permanently connected between conductors 57 and 58 and are provided with adjusting means 60. Resistances 61 and 62, also provided with adjusting means 60, each have one terminal connected with conductor 57 and the other terminals arranged to be connected with the conductor 58 under the control of contacts 63 and 64, respectively. As illustrated, contact 63 is part of a relay 65 having an operating coil 66 and including also contacts 67 and 68. The contact 64 is the normally closed contact of a relay 69 having an operating coil 70 connected to be energized from the control-voltage supply lines 24 and 25a under the control of a switch 71. The contacts 63 and 64 are controlled to change the ratio of the voltage impressed on the cathode of electric valve 55 with respect to the load voltage at predetermined times in the pattern of load voltage by the relays 65 and 69 as will be described in more detail at a later point in the specification in connection with the operation of the system as a whole.

The resistor 44 which, as previously mentioned, is utilized to impress a unidirectional voltage on the control member of electric valve 27 is energized by a transient voltage responsive to the voltage of the load circuit. As illustrated in the drawing, a unilaterally conducting device 72, such as a gaseous-discharge electric valve, is connected with the anode-cathode circuit thereof in series with resistor 44, a capacitor 73, the secondary winding 74 of a transformer 75, and a resistor 76. The primary winding 77 of the transformer 75 is connected across the conductors 56 and 58 to energize the transformer in accordance with the load voltage. A resistor 78 and a capacitor 79 are connected in parallel and across resistor 44 and capacitor 73. Means for discharging the capacitor 73 is provided by a circuit shunting the capacitor and including a discharge resistor 80 and the normally closed contact 81 of a relay 82 having an operating coil 83. The relay 82 has a normally closed contact 84 which controls a discharge circuit for capacitor 47 including a discharge resistor 85.

The energizing circuit for the operating coil 83 of relay 82 is completed from the conductor 24 to the conductor 25a through a normally closed contact 86 of a relay 87 having an operating coil 88 arranged to be energized from the control-voltage supply lines 24 and 25a through a switch 89. As illustrated, the relay 87 also includes a normally open contact 90 which establishes a circuit from conductor 25a to conductor 24 through the operating coil 66 of relay 65 and the normally closed contact 91 of a relay 92. The relay 92 is preferably a voltage-responsive relay which is energized in accordance with the load circuit voltage and which picks up at a voltage somewhat more than the voltage of the load circuit to be maintained during the first period of the load voltage pattern but less than the voltage to be maintained during one of the subsequent periods of the pattern.

A better understanding of the illustrated embodiment of my invention may be had by a brief consideration of the operation thereof, reference being had to Fig. 2 in which the operative positions of the relays with respect to the load-voltage cycle is illustrated. When the relay is in operated position, the line illustrating the relay is offset upwardly. Each line is designated by the numeral designating the corresponding relay in Fig. 1. Let it be assumed that the supply circuit 15 is energized and the switch 19 closed. Under these conditions, the transformer 21 is energized which, in turn, energizes the heater elements of electric valves 27 and 39. The heater elements for electric valves 55 and 72 have not been shown connected but it will be assumed that these are also energized when transformer 23 is energized. If, after the valves are at operating temperature, it is desired to initiate the energization of the load circuit with a pattern of voltage which has been preestablished by the adjustment of the sliders 60 on the resistors 59, 61, and 62, the switch 20 is closed and the load circuit is energized through the winding 18 of the saturable inductive device 17. At the instant of closure of switch 20, there is no unidirectional current through the control winding 18 so that the impedance of the winding 16 is at a maximum and the load voltage is substantially zero. The current through the winding 18 at this time is maintained at zero by electric valve 27 which is maintained nonconductive by the lagging component of alternating-current voltage and the negative voltage of resistor 46 which are impressed on the control member 31 thereof. When switch 20 is closed, contact 26 is closed to energize the conductor 25a and complete a circuit for the winding 83 of relay 82 through the contact 86 of relay 87. Time-delay relays 69 and 87 are also energized from conductors 24 and 25a, assuming that switches 71 and 89 are in closed position. Operation of relay 82 opens contacts 81 and 84 and opens the discharge circuits of capacitors 73 and 47. As soon as contacts 81 and 84 open, capacitor 73 starts to charge through resistor 44 and capacitor 47 starts to charge through resistors 53 and 54 and gradually to increase the net positive component of unidirectional voltage impressed on control member 31 of electric valve 27 to increase the current conducted by control winding 18 and, in this way, gradually increase the voltage impressed on the load circuit, as shown at A on the load-voltage curve of Fig. 2. At some time during this increase of voltage, the relay 92 picks up to open contact 91 for a purpose to be described hereinafter. As the load voltage increases, a transient voltage opposing the increase in voltage is impressed on the control member 31 by means of resistor 44. This voltage is derived from the transformer 75 and has an exponential characteristic dependent upon the charging rate of capacitor 73. After the load voltage has reached a steady value, the capacitor 73 becomes fully charged and the voltage of resistor 44 reduces to zero. The voltage of resistor 44 acts as a stabilizing or antihunting voltage to prevent overshooting of the load voltage and also functions along with the voltage of capacitor 47 to delay the intial build-up of current in the load circuit.

As soon as the load circuit is energized, the voltage thereof is impressed on the cathode of the electric valve 55 through resistors 59 and 62 in parallel. The magnitudes of these resistors determine the ratio of the voltage of the load circuit and the voltage impressed on the cathode of electric valve 55 and, as a result, determine the voltage of the load circuit which the regulator circuit will maintain. If the voltage of the load circuit tends to increase above that for which the regulator is set, the energization of the cathode of valve 55 is increased, which reduces the impedance of the valve and decreases the positive voltage impressed on the control member 31 by capacitor 47. This decreases the conductivity of valve 27 and, as a result, increases the impedance of device 17 and restores the load voltage to the desired value. If the load voltage tends to decrease below the preset value, the converse of this action takes place and the current through the control winding 18 is increased to reduce the impedance of the device 17 and, as a result, restore the voltage of the load circuit. From the above, it is seen that the load voltage is regulated at the preestablished value regardless of supply circuit voltage fluctuations or changes in load impedance. A predetermined time after closure of control 27, the relay 69 is operated to open contacts 64 and remove the resistor 62 from the circuit of the cathode of electric valve 55. Inasmuch as resistors 62 are in parallel with resistors 59, the removal of resistors 62 increases the impedance in circuit with the cathode of valve 55 so that a higher load voltage is required for a given energization of the cathode of valve 55. In this way, a higher level of voltage is maintained during the second period of load circuit voltage illustrated at B in Fig. 2. A predetermined time after closure of contact 27, the time delay relay 87 operates to terminate the second period of load circuit voltage pattern. When relay 87 picks up, contacts 86 open, thus deenergizing the operating coil of relay 82. This closes contacts 84 to establish the discharge circuit for the capacitor 47 and render the electric valve 27 nonconductive. This allows the load voltage to decrease until relay 92 drops out which, as previously mentioned, is preferably slightly below the load voltage to be maintained during the third period of the load-voltage pattern. The load voltage drops suddenly, as illustrated at C in Fig. 2, during the period that electric valve 27 is maintained nonconducting and, as soon as relay 92 drops out, relay 65 is energized from conductors 24 and 25a through contact 91 of relay 92 and contact 90 of relay 87. Operation of relay 65 closes contacts 63 to connect resistors 60 and 61 in parallel in the circuit of the cathode of electric valve 55 and establishes the voltage level to be maintained during the third period of the load-voltage pattern illustrated at D in Fig. 2. Operation of relay 65 closes contacts 67 to seal in relay 65 and closure of contacts 68 completes an energizing circuit for relay 82 to open the contacts 81 and 84 and return control to the regulator including electric valves 55 and 27.

The seal-in contact 67 is only necessary in the event that the load voltage to be maintained during the third period of the voltage pattern is high enough to pick up relay 92 and open contact 91. The switching sequence outlined above prevents the reduction of resistance in series with the cathode of valve 55 required for a lower load-voltage level from being accomplished until after the load voltage has been reduced below this level. This prevents damage to the regulating tube 55 which might otherwise result. The drop in load voltage is accomplished by maintaining valve 27 nonconducting until the load voltage falls below the level to be maintained during the third period of the load-voltage pattern. When the load-voltage pattern is complete, switch 20 is opened and the system is reset for another operation. While time-delay relays of the mechanical type have been illustrated at 69 and 87, it will be understood that electronic time-delay relays may be employed, if desired. Similarly, the opening of the switch 20 and contact 27 may be controlled by a time-delay relay, if desired. As illustrated in Fig. 2, the contact 27 is closed during the entire pattern of load voltage or for the sum of periods 1, 2 and 3. Similarly, relay 69 is energized during the periods 2 and 3, and relay 87 is energized during the third period only of the load voltage pattern.

In one application for which the illustrated embodiment of my invention has been employed, the voltage during the first period has been maintained at 18 volts, during the second period at 26 volts, and during the third period at 13 volts. When the system is adjusted for these voltages, it has been found desirable to have the relay 92 pick up at about 14 volts and to drop out at about 10 volts. The relay must be capable of withstanding the maximum voltage of 26 volts.

From the foregoing description, it will be apparent that my invention provides a system which not only permits the energization of a load circuit in accordance with a preestablished pattern of voltage or current but also maintains close regulation of the voltage during each period of the voltage or current pattern. Protection of the regulating tube is also provided when transferring from a higher to a lower level of load voltage. It will be apparent that the system of the present invention may be employed for regulating current or any other desired condition instead of voltage.

While I have shown and described a particular embodiment of my invention, it will be obvious to those skilled in the art that changes and modifications may be made without departing from my invention in its broader aspects, and I therefore aim in the appended claims to cover all such changes and modifications as fall within the true spirit and scope of my invention.

What I claim as new and desire to secure by Letters Patent of the United States is:

1. In combination, an alternating-current supply circuit, a load circuit, electric translating apparatus interconnecting said circuits including a saturable inductive device having a control winding, an electric valve including a control member for controlling the energization of said control winding, and means for energizing the control member of said electric valve to maintain an electrical condition of said load circuit at predetermined different levels during different time intervals including timing means for establishing said intervals and means energized from said load circuit for regulating said condition at each of said levels.

2. In combination, a load circuit, means for energizing said load circuit including electric translating apparatus, a control circuit for controlling said translating apparatus to maintain an electrical condition of said load circuit at predetermined different levels during successive time intervals comprising an electric valve having a cathode of the filamentary type and a circuit interconnecting said filament and said load circuit including a plurality of impedance elements and a switching means, and means including timing means for effecting operating said switching means selectively to energize said cathode from said load circuit through impedances of different magnitudes during different ones of said intervals to change the ratio between the electrical condition of said load circuit and the energization of said filamentary cathode.

3. In combination, an alternating-current supply circuit, a load circuit, electric translating apparatus interconnecting said circuits including a saturable inductance device having a control winding, an electric valve including a control member for controlling the energization of said control winding, a control circuit for controlling the energization of said control member to maintain an electrical condition of said load circuit at a predetermined level during one time interval and at a different level at a second time interval, means for regulating said condition at each of said levels including an electric valve having a cathode of the filamentary type, an energizing circuit interconnecting said filament and said load circuit including means for completing said energizing circuit during the first of said intervals through an impedance of predetermined magnitude, and for completing said energizing circuit during said second interval through an impedance of smaller magnitude, means for effecting an unregulated change of said electrical condition from the level maintained during said first interval to substantially the level to be maintained during said second interval before completing said energizing circuit through said lower impedance to prevent damage to said filamentary cathode.

4. In combination, a load circuit, means for energizing said load circuit including electric translating apparatus, a control circuit for controlling said translating apparatus to maintain an electrical condition of said load circuit at a predetermined level during one time interval and at a different level during a second time interval, means for regulating said condition at each of said levels including an electric valve having a cathode of the filamentary type, an energizing circuit interconnecting said filament and said load circuit including means for completing said energizing circuit during the first of said intervals through an impedance of predetermined magnitude and for completing said energizing circuit during said second interval through an impedance of smaller magnitude, means for effecting an unregulated change of said electrical condition from the level maintained during said first interval to substantially the level to be maintained during said second interval before completing said energizing circuit through said lower impedance to prevent damage to said filamentary cathode.

5. In combination, a load circuit, means for energizing said load circuit, electric translating apparatus interconnecting said circuits, a control circuit for controlling said translating apparatus to maintain an electrical condition of said load circuit at a lower level during a subsequent time interval, means for regulating said condition at each of said levels including an electric valve having a cathode of the filamentary type, a circuit interconnecting said filament and said load circuit, means for completing said circuit during the first of said intervals to energize said filamentary cathode with a voltage having a predetermined magnitude relative to the level of the electrical condition of said load circuit during said one interval, means for subsequently energizing said filamentary cathode with a voltage having a higher value relative to the magnitude of the electrical condition of said load circuit during said subsequent interval, and means for preventing operation of said last-mentioned means until said electrical condition of said load circuit has been reduced to a value substantially as low or lower than the level of said condition to be maintained during said subsequent period.

6. In combination, a load circuit, means for energizing said load circuit including electric translating apparatus, means for controlling said translating apparatus comprising an electric discharge device having a grid, means for impressing a unidirectional voltage on said grid to control an electrical condition of said load circuit and comprising a second electric discharge device having a filamentary cathode, means responsive to said electrical condition for energizing said filamentary cathode and for maintaining a predetermined value of said electrical condition for a predetermined period, timing means for changing the energization of said filamentary cathode to establish a second predetermined value of said electrical condition for a second predetermined period, and timing means for changing the energization of said filamentary cathode to establish a third predetermined value of said electrical condition for a third predetermined period.

7. A control circuit for controlling an electrical condition of a load circuit comprising an electric discharge device having a grid, a second electric discharge device of the type including a filamentary cathode for impressing a unidirectional voltage on said grid, means responsive to said electrical condition for controlling the energization of said filamentary cathode and for maintaining said electrical condition at a predetermined value for a predetermined period of time, means for changing the energization of said filamentary cathode to maintain said electrical condition at a second predetermined value for a second predetermined period of time, and means for changing the energization of said filamentary cathode to maintain a third predetermined value of said electrical condition for a third period of time.

8. In combination, an alternating current supply circuit, a load circuit, means for controlling an electrical condition of said load circuit comprising an electric discharge device having a grid, a second electric discharge device of the type including a filamentary cathode for impressing a unidirectional voltage on said grid, means responsive to said electrical condition for controlling the energization of said filamentary cathode and for maintaining said electrical condition at a predetermined value for a predetermined number of cycles of voltage of said supply circuit, and means for changing the energization of said filamentary cathode to maintain said electrical condition at a second predetermined value for a second predetermined number of cycles of voltage of said supply circuit.

9. In combination, a load circuit, means for energizing said load circuit including electric translating apparatus, means for controlling said translating apparatus comprising an electric discharge device having a grid, means for impressing a unidirectional voltage component on said grid in response to a predetermined electrical condition of said load circuit and including a second electric discharge device of the filamentary cathode type wherein the cathode is variably energized in response to said electrical condition, means for impressing an alternating component of voltage on said grid, initiating means for initiating energization of said load circuit including means for impressing said unidirectional component of voltage on said grid, and reactive means connected with said grid for delaying the rise of voltage of said grid due to said unidirectional component to effect the gradual application of voltage to said load circuit.

10. In combination, a load circuit, means for energizing said load circuit including electric translating apparatus connected between said circuits and comprising an electric discharge device having a grid, means for impressing an alternating component of voltage on said grid, means for impressing a unidirectional voltage on said grid and comprising a second electric discharge device having a filamentary cathode, means responsive to an electrical condition of said load circuit for energizing said cathode to vary said unidirectional voltage and thereby maintain a predetermined characteristic of said condition, means for initiating energization of said load circuit including means for establishing said unidirectional component of voltage, and means connected to said grid for controlling the rate of rise of the voltage impressed on said grid to advance gradually the instant of initiation of conduction of said discharge device and thereby to effect the gradual application of voltage to said load circuit.

ORRIN W. LIVINGSTON.